United States Patent [19]

Katamoto

[11] Patent Number: 5,269,842
[45] Date of Patent: Dec. 14, 1993

[54] IRON OXIDE COLORING AGENT FOR SUPPRESSING AGING OF RESINS

[75] Inventor: Tsutomu Katamoto, Hiroshima, Japan

[73] Assignee: Toda Kogyo Corporation, Hiroshima, Japan

[21] Appl. No.: 682,081

[22] Filed: Apr. 9, 1991

[30] Foreign Application Priority Data

Apr. 18, 1990 [JP] Japan ................................. 2-104322

[51] Int. Cl.$^5$ ............................................... C09C 1/22
[52] U.S. Cl. ..................... 106/457; 106/459; 106/483
[58] Field of Search ............... 106/457, 459, 456, 415, 106/482, 483

[56] References Cited

U.S. PATENT DOCUMENTS

| | | | |
|---|---|---|---|
| 3,565,656 | 2/1971 | Allen et al. | 106/459 |
| 4,404,254 | 9/1983 | Franz et al. | 106/457 |

FOREIGN PATENT DOCUMENTS 53-43729  4/1978  Japan.

Primary Examiner—Mark L. Bell
Assistant Examiner—Margaret Einsmann
Attorney, Agent, or Firm—Nixon & Vanderhye

[57] ABSTRACT

Disclosed herein is an iron oxide coloring agent capable of suppressing aging of resins comprising plate-like hematite particles coated with amorphous silicon dioxide or hydrated alumina containing silicon dioxide fine particles or hydrated alumina fine particles having an average particle diameter of 50 to 1,000 Å.

3 Claims, No Drawings

IRON OXIDE COLORING AGENT FOR SUPPRESSING AGING OF RESINS

BACKGROUND OF THE INVENTION

The present invention relates to an iron oxide coloring agent for resins and, more particularly, to an iron oxide coloring agent which is capable of suppressing to the minimum the aging of a resin, especially the aging of a resin having chlorine atom and being colored with an iron oxide pigment which is caused by the influence of the heat applied to the resin during processing or the light during exposure to the open air.

Resins having chlorine atom, especially, chlorine-containing thermoplastic resins are used as molding materials. For example, polyvinyl chloride, chlorinated polyethylene, chlorinated polypropylene and polyvinylidene chloride are well known. Among these, polyvinyl chloride is widely used. The phenomenon of aging of chlorine-containing resins will now be explained citing a polyvinyl chloride representative of these resins.

In polyvinyl chloride, even if it is not colored with an iron oxide pigment, the polyvinyl chloride is decomposed and degenerated by heat-treatment during processing or light exposed to after it is molded into products, thereby giving rise to the phenomena of aging.

The phenomenon of aging in resins is caused by reason that a part of chlorine bonding in a polyvinyl chloride is decomposed at 100 to 200° C. by heat or light action, thereby generating hydrogen chloride and forming a polyene structure having a double bonding, and further the hydrogen chloride generated secondarily acts on the resin itself, thereby cutting a part of C—C bonding of a polymer or producing a cross-linking as a chain reaction.

It is generally known that in order to suppress such aging, a neutralizer such as a lead compound and metallic soap for neutralizing the hydrogen chloride generated by decomposition or a resin stabilizer such as an organic tin compound and an epoxy compound which is effective in suppressing the generation of a double bonding, is added to a polyvinyl chloride powder for an ordinary thermoforming material even when it is not colored by an iron oxide pigment.

As coloring agents for polyvinyl chloride, inorganic pigments which are excellent in the light resistance and heat resistance, namely, iron oxide pigments such as ferric oxide pigments are conventionally used widely. However, since metals such as Mn, Fe, Co, Ni, Cu and Zn have an accelerating action of the dehydrochlorination, as well known, in the case of mixing an iron oxide pigment with a polyvinyl chloride as a coloring agent, the aging of the resin is greatly accelerated.

Various methods of improving the capability of iron oxide pigments to suppress aging of resins have been studied. For example, a method of improving an aging resistance by forming a continuous fine silica film on the surfaces of the particles of an iron oxide pigment (Japanese Patent Publication No. 54-7292 (1979)), a method of improving an aging resistance by coating the surfaces of the particles of an iron oxide pigment with glassy Na and/or K-Si (Japanese Patent Publication No. 53-11537 (1978)) and a method of improving an aging resistance by depositing $SiO_2$ on the surfaces of the particles of an iron oxide pigment and further depositing aluminum hydroxide on the deposited $SiO_2$ (Japanese Patent Application Laid-Open (KOKAI) No. 53-36538 (1978)) are known.

An iron oxide coloring agent having an excellent capability to suppress aging of resins is now in demand, but the above-described known iron oxide pigments cannot be said to impart a sufficient aging resistance, we will be shown in the later-described comparative examples.

Accordingly, it is the strongest demand to provide an iron oxide coloring agent excellent in imparting aging resistance.

As a result of the present inventors' studies, it has been found that by adding silicon dioxide fine particles or hydrated alumina fine particles and a silicate or an aluminate to a suspension containing plate-like hematite particles and adjusting the pH of the resultant suspension, the obtained plate-like hematite particles the surfaces of which are coated with amorphous silicon dioxide or hydrated alumina containing silicon dioxide fine particles or hydrated alumina fine particles having an average particle diameter of 50 to 1,000 Å, are excellent in imparting aging resistance and are useful as an iron oxide coloring agent. The present invention has been achieved on the basis of this finding.

SUMMARY OF THE INVENTION

In a first aspect of the present invention, there is provided an iron oxide coloring agent capable of suppressing aging of resins comprising plate-like hematite particles coated with amorphous silicon dioxide or hydrated alumina containing silicon dioxide fine particles or hydrated alumina fine particles having an average particle diameter of 50 to 1,000 Å.

In a second aspect of the present invention, there is provided a process for producing an iron oxide coloring agent as defined in the first aspect, comprising the steps of adding silicon dioxide fine particles or hydrated alumina fine particles and a silicate or an aluminate to a suspension containing plate-like hematite particles, and adjusting the pH of the resultant suspension to the range of 5.5 to 9.0.

DETAILED DESCRIPTION OF THE INVENTION

In the present invention, the amount of amorphous silicon dioxide or hydrated alumina containing silicon dioxide fine particles or hydrated alumina fine particles having an average particle diameter of 50 to 1,000 Å and covering the surfaces of plate-like hematite particles is 0.001 to 0.1 g, preferably 0.005 to 0.05 g of Si calculated as $SiO_2$ and 0.001 to 0.1 g, preferably 0.005 to 0.05 g of Al calculated as $Al(OH)_3$ based on 1 $m^2/g$ of the specific surface area of the plate-like hematite particles.

If this amount is less than 0.001 g, the improvement of the aging resistance is insufficient. On the other hand, if it exceeds 0.1 g, the orientation property of the particles is inferior and use of such a large amount of Si and Al is economically disadvantageous.

The content of silicon dioxide fine particles or hydrated alumina fine particles in the coating material according to the present invention is 5 to 95 wt%, preferably 10 to 90 wt%.

If it is less than 5 wt%, the orientation property of the particles is inferior. If it exceeds 95%, the aging resistance is inferior.

The plate-like hematite particles used in the present invention are coated with amorphous silicon dioxide or hydrated alumina containing silicon dioxide fine particles or hydrated alumina fine particles having an average particle diameter of 50 to 1,000 Å, preferably 100 to 500 Å by adding colloidal silicon dioxide fine particles or hydrated alumina fine particles and a silicate or an aluminate to a suspension containing plate-like hematite particles and adjusting the pH of the suspension.

As the starting material plate-like hematite particles, hematite particles having an average particle diameter of 0.1 to 100 μm, a thickness of 0.005 to 15 μm, a plate ratio (diameter of plate surface/thickness of particle) of 2:1 to 500:1 and a specific surface area of 0.05 to 60 $m^2/g$ and obtained naturally or by synthesis are usable.

Plate-like hematite particles having an average particle diameter of 0.5 to 5.0 μm, a thickness of 50 to 500 Å, a plate ratio of 50:1 to 500:1 and a specific surface area of 5 to 30 $m^2/g$ are preferably because they can sufficiently exhibit a shielding effect to light or heat due to their large plate ratio.

As the silicon dioxide fine particles, commercially available colloidal silica and the like may be used.

As the hydrated alumina fine particles, commercially available alumina sol and the like may be used.

As the silicate, sodium silicate and potassium silicate are usable. The silicate reacts with an acidic aqueous solution and deposits on the surfaces of the plate-like hematite particles as amorphous silicon dioxide.

As the aluminate, sodium aluminate, aluminum chloride, aluminum sulfate, etc. are usable. The aluminate is neutralized and deposits on the surfaces of the plate-like hematite particle as amorphous hydrated alumina.

The hydrated alumina may have any structure such as a gibbsite structure and a boehmite structure, and also includes aluminum hydroxide in the form of gel or the like.

After the resultant mixed suspension is stirred, sulfuric acid, nitric acid or the like is added thereto so as to adjust the pH of the stirred suspension to the range of 5.5 to 9.0. Thus, the surfaces of the hematite particles are coated with amorphous silicon dioxide or hydrated aluminum containing silicon dioxide fine particles or hydrated alumina fine particles having an average particle diameter of 50 to 1,000 Å.

The reason why an iron oxide coloring pigment which is excellent in the aging resistance is obtained in accordance with the present invention is that the surfaces of plate-like hematite particles are coated with amorphous silicon dioxide or hydrated aluminum containing silicon dioxide fine particles or hydrated alumina fine particles having an average particle diameter of 50 to 1,000 Å. As shown in the later-described examples and comparative examples, the aging resistance is inferior both in the case of coating the surfaces of plate-like hematite particles only with silicon dioxide fine particles or hydrated alumina fine particles and in the case of coating the surfaces of plate-like hematite particles only with amorphous silicon dioxide or hydrated aluminum.

The present inventors consider the reason why an iron coloring pigment which is excellent in imparting aging resistance is obtained in accordance with the present invention to be as follows. The silicon dioxide fine particles or hydrated alumina fine particles having an average particle diameter of 50 to 1,000 Å separate the agglomeration of the plate surfaces of the plate-like hematite particles into discrete particles and a continuous uniform and dense coating film of amorphous silicon dioxide or hydrated alumina is formed on the surfaces of the discrete particles with the silicon dioxide fine particles or the hydrated alumina fine particles as connecting points. The continuous coating film sufficiently suppresses the dehydrochlorination which may be caused by the plate-like hematite particles themselves, and the discrete plate-like hematite particles are oriented in the direction of the plane of the resin to a high degree, so that they fully display the shielding effect to light and heat. In this way, the iron oxide coloring pigment can sufficiently suppress the influence of light and heat on the resin.

The coated hematite particles as an iron oxide coloring agent according to the present invention have an average plate surface diameter of 0.1 to 100 μm, preferably 0.5 to 5.0 μm, a thickness of 0.005 to 15 μm, preferably 50 to 500 Å and a plate ratio (diameter of plate surface/thickness of particle) of 2:1 to 500:1, preferably 50:1 to 500:1.

In an iron oxide coloring agent of the present invention, the time in which it is resistant to color change due to aging at 130° C. is not less than 50 hours, preferably, not less than 60 hours, more preferably not less than 65 hours, and the orientation degree is not less than 28, preferably not less than 30.

An iron oxide coloring agent of the present invention is suitable, as an iron oxide coloring agent capable of supressing aging of resins due to its excellent aging resistance.

EXAMPLES

The present invention will be explained in the following with reference to the following examples and comparative examples.

In each of the following examples and comparative examples, the average particle diameter is expressed by the value obtained from the measurement of an electron micrograph, and the thickness and the plate ratio are expressed by the value obtained from the specific surface area measured by a BET method and the average particle diameter obtained in the above-described way.

The aging resistance is expressed by the time required for the color of a test piece for a heat resistance test to change into black. The test piece was produced by weighting out 1 g of a mixture which was obtained by mixing 1 g of an iron oxide coloring agent and 0.6 g of dioctyl phthalate, mixing the mixture with 50 g of a polyvinyl chloride compound having the following composition, kneading the resultant mixture by a hot roll and molding the kneaded mixture. The thus-obtained test piece was placed in a Geer oven at 130° C. for observation.

| <Composition of the Polyvinyl Chloride Compound> | |
|---|---|
| Polyvinyl chloride 103 EP (produced by Japanese Zeon Co., Ltd.) | 100 g |
| Dioctyl phthalate | 50 g |
| Calcium stearate | 0.5 g |
| Zinc stearate | 0.5 g |

The orientation degree is expressed by the ratio of the intensity $I_{(006)}$ of the X-ray peak of hematite in the face 006 to the intensity $I_{(110)}$ of the X-ray peak of hematite in the face 110 obtained by X-ray diffraction of the test piece. The larger the value is, the more excellent is the orientation degree.

EXAMPLE 1

100 g of plate-like hematite particles having an average diameter of 3.0 μm, a thickness of 0.025 μm, a plate ratio (diameter of plate surface/thickness of particle) of 120 and a BET specific surface area of 15.5 m²/g, 120 g of a colloidal silica Snowtex ST-20 (produced by Nissan Chemicals Industries, Ltd., SiO₂: 20 wt%) and 3.15 g of sodium aluminate (the Al content corresponds to 3 wt% calculated as aluminum hydroxide) were added to 10 l of water and mixed with each other. Thereafter, sodium hydroxide was added to the mixture to obtain a mixed suspension of pH 10.7.

After the suspension was stirred and mixed, sulfuric acid was added thereto to adjust the pH of the suspension to 7.0, thereby obtaining plate-like hematite particles wherein amorphous hydrated aluminum containing SiO₂ fine particles was deposited onto the surfaces thereof. (The coating process with this pH adjustment will be referred to as "Process A" hereinafter.)

The suspension containing the precipitated particles was filtered, washed with water and dried by an ordinary method.

According to fluorescent X-ray spectroscopy, the amount of Si existent on the surfaces of the particles was 22 wt% calculated as SiO₂ based on the plate-like iron oxide and the amount of aluminum was 2.8 wt% calculated as Al(OH)₃ based on the plate-like iron oxide.

As a result of observation through an electron microscope, the particles were proved to be discrete.

The results of examination of the test piece produced from this particle powder are shown in Table 2.

EXAMPLE 2

100 g of plate-like hematite particles having an average diameter of 2.8 μm, a thickness of 0.026 μm, a plate ratio of 108 and a BET specific surface area of 14.9 m²/g and 58.6 g of water-glass (produced by Tokuyama Soda Co., Ltd., Si content corresponds to 29.0 wt% calculated as SiO₂) were added to 10 l of water and mixed with each other. Thereafter, sulfuric acid was added to the mixture to adjust the pH of the mixture to 3. 10 g of alumina sol AS-520 (produced by Nissan Chemicals Industries, Ltd., solid content: 20%, boehmite structure) was added to the mixture and the resultant mixture was stirred and mixed. A sodium hydroxide solution was then added to the mixture to adjust the pH thereof to 7, thereby obtaining plate-like hematite particles wherein amorphous silicon dioxide containing boehmite fine particles was deposited onto the surfaces thereof. (The coating process with this pH adjustment will be referred to as "Process B" hereinafter.)

The suspension containing the precipitated particles was filtered, washed with water and dried by an ordinary method.

According to fluorescent X-ray spectroscopy, the amount of Si existent on the surfaces of the particles was 16 wt% calculated as SiO₂ based on the plate-like iron oxide and the amount of amorphous aluminum hydroxide was 1.8 wt% based on the plate-like iron oxide.

EXAMPLES 3 to 7, COMPARATIVE EXAMPLES 1 to 7

Iron oxide coloring agents were obtained in the same method as in Example 1 except for varying the kind of iron oxide particles, the kind and the amount of silicon dioxide fine particles or hydrated alumina fine particles, the kind and the amount of water-soluble silicate or aluminate and the coating method.

The main producing conditions thereof are shown in Table 1 and the results of examinations of the test pieces produced therefrom are shown in Table 2.

In the coating process in Example 4, after sulfuric acid was added to an aqueous suspension containing the plate-like hematite particles so as to adjust the pH to 3.0, colloidal silica Snowtex ST-0 (produced by Nissan Chemicals Industries, Ltd., Si₂: 20 wt%) and aluminum sulfate were added to and mixed with the suspension. Thereafter, sodium hydroxide was added to the mixture to obtain a mixed suspension of pH 7.0. (The coating process with this pH adjustment will be referred to as "Process C" hereinafter.)

TABLE 1

| Example & Comparative Example | Iron oxide particles | | | | | Silicon dioxide fine particles or hydrated alumina fine particles | | | Water-soluble silicate or aluminate | | Coating process |
|---|---|---|---|---|---|---|---|---|---|---|---|
| | Shape | Plate surface diameter (μm) | Thickness (μm) | Plate ratio | Specific surface area (m²/g) | Type | Particle diameter (Å) | Q'ty (wt %) | Type | Q'ty (wt %) | |
| Example 1 | Plate | 3.0 | 0.025 | 120 | 15.5 | Snowtex ST-20 | 150 | 24 | Sodium aluminate | 3 | A |
| Example 2 | " | 2.8 | 0.026 | 108 | 14.9 | AS-520 | 1000 | 2 | Water glass No. 3 | 17 | B |
| Example 3 | " | 2.5 | 0.025 | 100 | 15.5 | Snowtex ST-0 | 200 | 12 | Water glass No. 3 | 12 | B |
| Example 4 | " | 2.5 | 0.025 | 100 | 15.5 | Snowtex ST-0 | 200 | 18 | Aluminum sulfate | 3 | C |
| Example 5 | " | 10 | 0.2 | 50 | 2.0 | Snowtex ST-20 | 150 | 8 | Water glass No. 3 | 8 | A |
| Example 6 | " | 10 | 1 | 10 | 0.4 | Snowtex ST-0 | 200 | 4 | Water glass No. 3 | 4 | B |
| Example 7 | " | 20 | 2 | 10 | 0.2 | AS-520 | 1000 | 3 | Water glass No. 3 | 3 | B |
| Comp. Ex. 1 | Plate | 3.0 | 0.025 | 120 | 15.5 | — | — | — | — | — | — |
| Comp. Ex. 2 | " | 3.0 | 0.025 | 120 | 15.5 | Snowtex ST-20 | 150 | 10 | — | — | A |
| Comp. Ex. 3 | " | 3.0 | 0.025 | 120 | 15.5 | AS-520 | 1000 | 10 | — | — | C |
| Comp. Ex. 4 | " | 3.0 | 0.025 | 120 | 15.5 | — | — | — | Water glass No. 3 | 20 | A |
| Comp. Ex. 5 | " | 10 | 0.2 | 50 | 2.0 | — | — | — | — | — | — |
| Comp. Ex. 6 | " | 10 | 0.2 | 50 | 2.0 | Snowtex ST-20 | 150 | 8 | — | — | A |
| Comp. Ex. 7 | " | 10 | 0.2 | 50 | 2.0 | — | — | — | Sodium aluminate | 4 | A |

TABLE 2

| Example & Comparative Example | Iron oxide coloring material | | | | | | | | Aging resistance (Hour) | Degree of orientation |
|---|---|---|---|---|---|---|---|---|---|---|
| | Silicon dioxide fine particles | | Hydrated alumina fine particles | | Amorphous silicon dioxide | | Amorphous hydrated alumina | | | |
| | (wt %) | *(g) | (wt %) | *(g) | (wt %) | *(g) | (wt %) | *(g) | | |
| Ex. 1 | 22 | 0.014 | — | — | — | — | 2.8 | 0.0018 | 65 | 70 |
| Ex. 2 | — | — | 1.8 | 0.0012 | 16 | 0.010 | — | — | 70 | 60 |
| Ex. 3 | 11 | 0.007 | — | — | 11 | 0.007 | — | — | 70 | 45 |
| Ex. 4 | 17 | 0.011 | — | — | — | — | 2.5 | 0.0016 | 72 | 47 |
| Ex. 5 | 7 | 0.035 | — | — | 7 | 0.035 | — | — | 68 | 35 |
| Ex. 6 | 3 | 0.075 | — | — | 3 | 0.075 | — | — | 69 | 32 |
| Ex. 7 | — | — | 1.7 | 0.085 | 1.7 | 0.085 | — | — | 70 | 30 |
| Com. Ex. 1 | — | — | — | — | — | — | — | — | 15 | 37 |
| Com. Ex. 2 | 8 | 0.005 | — | — | — | — | — | — | 16 | 33 |
| Com. Ex. 3 | — | — | 7 | 0.0045 | — | — | — | — | 16 | 34 |
| Com. Ex. 4 | — | — | — | — | 17 | 0.011 | — | — | 25 | 25 |
| Com. Ex. 5 | — | — | — | — | — | — | — | — | 17 | 24 |
| Com. Ex. 6 | 6 | 0.03 | — | — | — | — | — | — | 18 | 22 |
| Com. Ex. 7 | — | — | — | — | — | — | 3 | 0.015 | 25 | 17 |

*Content per $m^2$ of hematite in the coating.

What is claimed is:

1. An iron oxide coloring agent capable of supressing aging of resins comprising plate-like hematite particles coated with (i) amorphous silicon dioxide containing silicon dioxide fine particles or hydrated alumina fine particles, both the silicon dioxide and hydrated alumina fine particles having an average particle diameter of 50 to 1,000 Å, or (ii) amorphous hydrated alumina containing silicon dioxide fine particles or hydrated alumina fine particles, these fine particles having an average particle diameter of 50 to 1,000 Å, said hematite particles having an average particle diameter (plate surface diameter) of 0.1 to 100 μm and a plate ratio (plate surface diameter/particle thickness) of 2:1 to 500:1.

2. An iron oxide coloring agent according to claim 1, wherein the amount of said amorphous silicon dioxide or amorphous hydrated alumina containing silicon dioxide fine particles of hydrated alumina fine particles is 0.001 to 01. g of Si calculated as $SiO_2$ and 0.001 to 0.1 g of Al calculated as $Al(OH)_3$ based on 1 $m^2/g$ of the specific surface area of said plate-like hematite particles.

3. An iron oxide coloring agent according to claim 1, wherein the amount of silicon dioxide fine particles or hydrated alumina fine particles is 5 to 95 weight percent.

* * * * *